(12) United States Patent
Meiners et al.

(10) Patent No.: US 6,861,613 B1
(45) Date of Patent: Mar. 1, 2005

(54) DEVICE AND METHOD FOR THE PREPARATION OF BUILDING COMPONENTS FROM A COMBINATION OF MATERIALS

(75) Inventors: Wilhelm Meiners, Aachen (DE); Andres Gasser, Aachen (DE); Konrad Wissenbach, Herzogenrath (DE)

(73) Assignee: Fraunhofer Gesellschaft zur Forderung der angewandten Forschung e.V., Munich (DE)

( * ) Notice: Subject to any disclaimer, the term of this patent is extended or adjusted under 35 U.S.C. 154(b) by 206 days.

(21) Appl. No.: 10/030,940

(22) PCT Filed: Jun. 26, 2000

(86) PCT No.: PCT/DE00/02093
§ 371 (c)(1),
(2), (4) Date: Feb. 20, 2002

(87) PCT Pub. No.: WO01/07239
PCT Pub. Date: Feb. 1, 2001

(30) Foreign Application Priority Data

Jul. 27, 1999 (DE) .......................................... 199 35 274

(51) Int. Cl.[7] .............................................. B23K 26/00
(52) U.S. Cl. ............................ 219/121.65; 219/121.66; 219/121.84
(58) Field of Search ..................... 219/121.6, 121.63, 219/121.64, 121.65, 121.66, 121.82, 121.84

(56) References Cited

U.S. PATENT DOCUMENTS 4,323,756 A * 4/1982 Brown et al.
4,818,562 A * 4/1989 Arcella et al.
5,637,175 A * 6/1997 Feygin et al.
5,837,960 A * 11/1998 Lewis et al.
6,046,426 A * 4/2000 Jeantette et al.

OTHER PUBLICATIONS

"Rapid Manufacturing", Heinz Haferkamp et al, *Laser-Praxis*, Oct. 1994, pp. 63–66.
"Freeform Powder Molding: From CAD Model To Part Without Tooling", *The International Journal Of Powder Metallurgy*, 33 (1997)6, pp. 37–44.

* cited by examiner

*Primary Examiner*—Samuel M. Heinrich
(74) *Attorney, Agent, or Firm*—Breiner & Breiner, L.L.C.

(57) ABSTRACT

The present invention relates to a generative method of fabrication and an accompanying device with which components can be fabricated from a combination of materials. The device comprises a bottom surface (1) with a lowerable building platform (2), a leveling mechanism (5) for leveling a first material (4) in a processing plane (3) above the building platform (2), a laser beam source for emitting a laser beam (11), a processing unit (6) with a focusing optical system (8) for focusing the laser beam (11) onto the processing plane (3) and a positioning mechanism which can position the processing unit (6) in any desired positions in a plane parallel to the processing plane (3) above the component (14). Furthermore, the device is provided with a suction device (10) for sectioning off the material from the processing plane (3) and an introduction mechanism (9) for a second material (12) with which the latter is brought into the focal range of the laser beam (11). This device permits fabrication of components of any desired complexity and adapted to a certain function, in which individual regions can be made of a second, harder material to increase sturdiness or to improve wear-resistance.

15 Claims, 1 Drawing Sheet

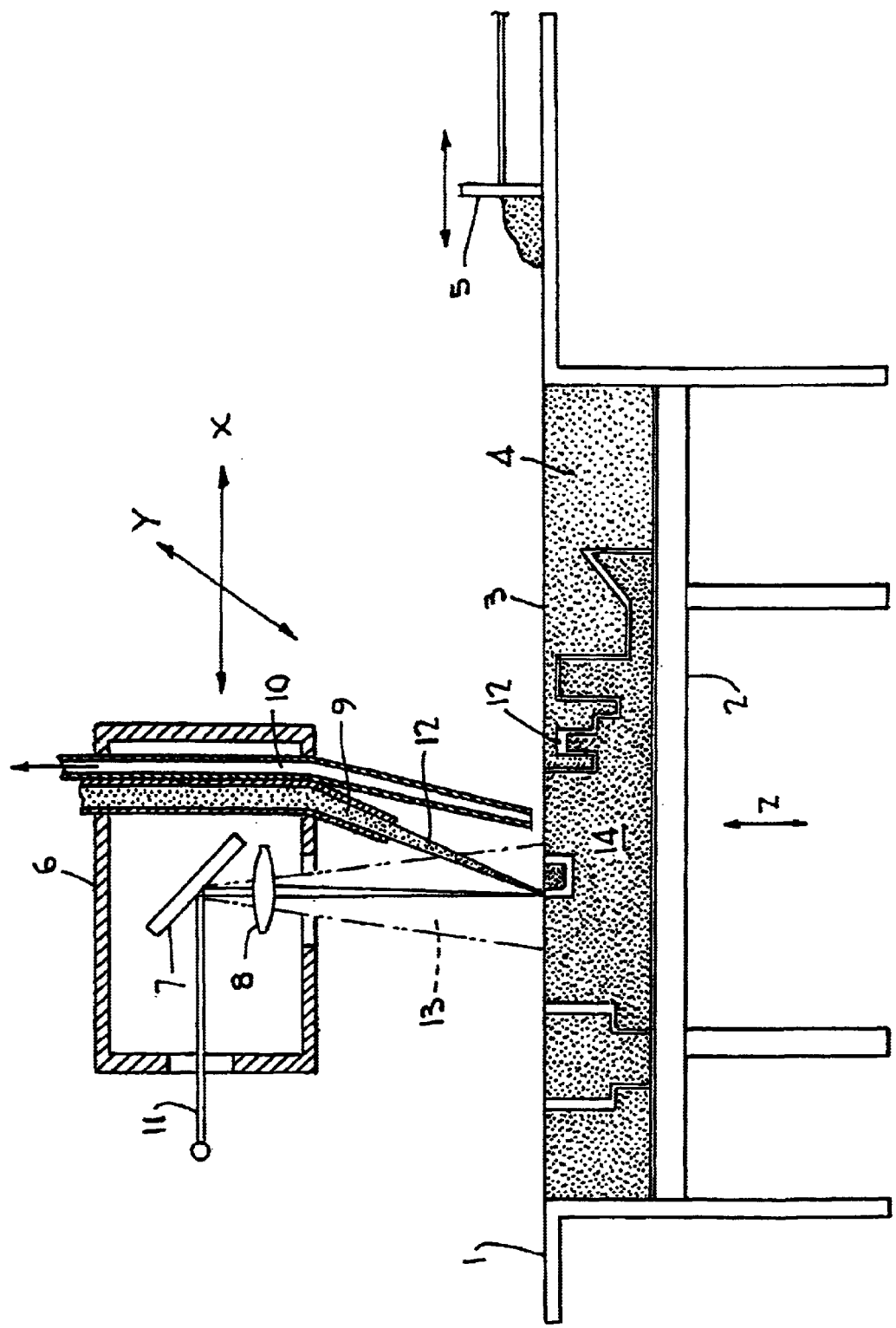

DEVICE AND METHOD FOR THE PREPARATION OF BUILDING COMPONENTS FROM A COMBINATION OF MATERIALS

The present invention relates to a process and a device for the preparation of building components from a combination of materials, in particular components in which different regions are made of different materials, for example in order to give special sturdiness to certain regions of the component.

The present process belongs to the category of so-called generative fabrication processes. These manufacturing processes have hitherto been primarily employed in the area of rapid prototyping in product development to shorten product development time and increase product quality. This is possible because rapid prototyping processes permit making prototypes from a 3D CAD model layer-wise. These processes obviate the very time-consuming designing of a NC program for milling or eroding processing and fabricating shaping tools.

An additional advantage of fabricating components in layers is the ability to produce very complex structures. This layer-wise fabrication process also permits building complex internal structures which would not be possible with conventional manufacturing processes.

The aim of developing new respectively improving present generative processes is to process almost series materials or even homogeneous series materials. If homogeneous series materials are used, these processes cannot only be employed in the field of rapid prototyping but also as the manufacturing process itself of the series products.

Generative fabrication processes known in the art, such as for example, selective laser beam melting (SLPR) or so-called laser beam generation, already permit making components from series-like or identical metallic materials. In both the processes, metallic components are produced in layers from a powdered material. The processes permit fabricating components with a density of approximately 100% so that their sturdiness is correspondingly high. However, both these processes are based on different principles and consequently the to-be-built components have different limitations.

Selective laser melting is a two-step process. First a plane layer of a powdered metallic material is applied onto a component platform. Then the to-be-produced form respectively contour of the layer is scanned with a laser and the powder is melted on track by track in the scanned region. In this manner the component is built up layer by layer.

DE 196 49 865 C1 describes an example of such a process, in which a device according to the generic part of the present claim 1 is employed. In this process, a powdered metallic material containing no binders and no flux additives is applied onto a component platform and is heated to the melting temperature corresponding to the configuration of the component. The energy of the laser beam is selected in such a manner that the entire thickness of powdered metallic material is completely melted on where the laser beam impinges. The laser beam is led in multiple tracks over the predetermined region of the respective powdered material layer in such a manner that each subsequent track partially overlaps the preceding one. Simultaneously, a protective gas atmosphere is maintained over the region where the laser beam interacts with the powdered metal material in order to prevent flaws, which may be caused for example by oxidation.

The process of selective laser beam melting permits fabricating components of any desired complexity with good accuracy and high precision.

A fundamental drawback of this process is, however, the limited range of the materials that can be utilized with this process. In particular, hard materials, such as for example carbides, can only be inadequately processed so that with these materials a component density of 100% can only be achieved with difficulty or not at all. Another disadvantage of this process is that hitherto the powdered material can only be changed layer-wise during a fabrication process, that is after processing a complete layer, however, not within a layer during processing. Thus, with this process, it is not possible to make components with another material locally within a layer. In many applications it would be desirable, for example, to reinforce components with a hard material at points that are especially subjected to more stress.

The laser beam generating process is a single-step process. In this process, the work material is continually introduced as a wire or powder via an introduction mechanism into the focal point of the laser beam. Introducing the material and supplying energy occurs simultaneously via the laser. If the material is a powder, the metallic powder is preferably fed via an inert gas flow to a powder nozzle and focused with it onto the to-be-processed point. The laser beam and the introduction mechanism are stationary in relation to each other and are moved according to the to-be-built shape or contour of the component in each layer. In this case too, the component is built up layer by layer by scanning the corresponding shape with the laser beam.

DE 195 33 960 A1 describes an example of such a process and an accompanying device for fabrication of metal work pieces in which by means of a powder nozzle, the powdered metal material is applied and melted onto the work piece track-wise coaxially to a laser beam. This printed publication also describes the application of a layer made of different materials including suctioning off or blowing off not melted powdered material from the surface of the work piece. In the process respectively with the device of this printed publication, the second material is apparently applied onto the surface of the work piece through the same powder nozzle as the first material.

DE 44 15 783 discloses a process for free-form fabrication of work pieces by application and layer-wise melting of metal powder. The metal powder is also applied track-wise by a powder nozzle and melted by means of a laser beam.

U.S. Pat. No. 5,578,227 presents a process and a device for building up a three-dimensional model by means of layer-wise application and melting of wire-shaped material onto the respective layer beneath by means of a laser beam.

An advantage of the laser beam generative process over the selective laser beam melting process is primarily the large number of metallic materials that can be processed with this process. Furthermore, hard materials can also be readily processed with it.

In contrast to the selective laser beam melting process, the components that can be produced with this laser beam generating process can, however, only be of little complexity. Thus, it is not possible to ensure adequate accuracy, in particular, in the case of filigree components if they measure less than 1 mm.

As a another method of building up components, EP 0 431 924 presents a 3D printing method for rapid prototyping, in which the individual layers of the layered build up of the work piece is solidified locally by adding a binder by using ink jet technology.

EP 0 322 257 describes a process and a device for layered build up of a work piece from a hardenable fluid. The hardening again occurs by scanning with a laser beam. Not hardened regions are subsequently suctioned off with a suction unit and filled with a support material, which can be removed when the product is finished. A suction unit is employed to suction off not solidified areas.

The object of the present invention is to provide a device and a process that permits fabricating complex components from a combination of materials in such a manner that single regions of the component can be made of different materials.

The object is solved with the device respectively the process according to claim 1 respectively claim 11. Advantageous embodiments of this device and this process are the subject matter of the subclaims.

Like the device for selective laser beam fusion, the invented device is provided with a bottom surface with a lowerable building platform for the component, an introduction mechanism with a mechanism for leveling a first material in a processing plane located above the building platform and a laser light source which emits a laser beam. Furthermore, a processing unit is provided which bears a focusing optical system for focusing the laser beam onto the processing plane. This processing unit is moved in a plane parallel to the processing plane with the aid of a positioning mechanism. The purpose of this positioning mechanism is, therefore, to produce the scanning movement of the laser beam on the processing plane according to the shape respectively contour of the to-be-fabricated component. The laser beam source may be placed directly on the processing unit or coupled in from the outside. In contrast to the devices of selective laser beam melting known in the art, the invented device also is provided with a suction unit or a blow-off unit for suctioning off material from the processing zone as well as an introduction mechanism for introducing a second material, this introduction mechanism brings this second material into the focal range of the laser beam. This introduction mechanism may be a feed mechanism for a wire material which is introduced into the focal range of the laser beam in the processing plane during processing. This introduction mechanism may also be a nozzle with which the powdered or pasty second material is brought into the laser's focal range. In both instances, the introduction mechanism is preferably attached directly to the processing unit in such a manner that the introduction mechanism moves along with it.

However, the introduction mechanism may be formed by an additional mechanism like the mechanism with which the first material is distributed in the first processing plane. In this event, a supply tank for the second material must be provided in addition to the supply tank for the first material.

Of course, not only a second material but also additional materials can be introduced with the mentioned means.

The intention of the process is to build up a component in layers by means of applying and melting materials layer by layer. The build up of at least one of the layers comprises the following steps:

a) A first material is uniformly and evenly distributed in the processing plane over the lowerable building platform for the component. Then the shape respectively the contour of the to-be-produced layer of component is scanned with the laser beam focused onto the processing plane of those (first) regions of the component, which are sought to be made of the first material, in such a manner that this first material is melted on according to the scanned shape in these regions.

b) Subsequently, this first material is suctioned off or blown off in the second regions of the processing plane, in which the component is sought to be made of a second material or from a chemical compound of the second material, in such a manner that room is created in these regions for the second material.

c) Following this, the second material is applied in the second regions of the processing plane. Then the shape of the layer is scanned by a laser beam focused onto the processing plane in the second regions, with the second material or the chemical compound of the second material being melted on according to the scanned shape in the second regions.

d) After completion of the layer, the building platform is, if necessary, lowered the thickness of the just produced layer so that the next layer can be applied.

The result is a layer of melted on and subsequently solidified first and second material in the form of a melted metallurgical compound with the shape respectively the contour of the layer of the respective component. Additional materials can be integrated in the same layer in the same manner as the second material. In this event, prior to application of the other materials, the residuary material is removed by means of suctioning off or blowing off from the regions intended for the additional materials.

Application of the second material can occur by the laser beam scanning the shape respectively the contour of the component layer which is sought to be made of a second material while the second material is brought concentrated into the focal range of the laser via a separate introduction mechanism.

However, the second material can also be applied in the same manner as the first material, for example using a scraper.

The additional layers of the component can either be built up in the same manner from a combination of steps a) to c) respectively d) or of only a single material by means of steps a) or c) respectively.

Thus, the described process offers the possibility of fabricating single layers only of the first material or only of the second material. If both materials are used within one layer, first the first material is melted onto the corresponding regions and then the second material is applied. Prior to application and fusing the second material in the regions intended for this material, the powdered first material is removed by a suction mechanism or a blow-off mechanism. Optionally, after completion of each layer, in addition, the surface can be leveled using a suited polishing device.

The invented process and the accompanying device permits fabrication of components of any desired complexity and individual regions of the component can be made of different materials. Thus, the second material can be used, for example, at points that are particularly subjected to stress. It is expedient to select a stress-resistant material as this second material. Thus components can be made in one step of combinations of materials adapted to the respective function.

Thus, the basic body of the component can be made with any desired complexity and with high precision, for example, of a light-weight material in that the first step is utilized to apply selective laser beam melting, with which a high degree of accuracy and complexity can be achieved. The regions of the component which subsequently will be subjected to special stress for which the material of the basic body is inadequate made of a second material in a second step. This second step is preferably based on laser beam generative technology so that materials of special hardness can be employed for it. With this described process and device, in particular, also regions in the interior of a component, which are inaccessible in the finished component, can be built up with the second material.

With the invented method and device, it is also possible to utilize other materials in addition to the second material via the introduction mechanism or an additional introduction mechanism so that components of more than two different materials can be made.

The present invention combines in a preferred embodiment the advantages of the methods of selective laser beam melting and laser beam generation known from the state of the art. In this manner, individual regions of the component can be built up with materials suited for a certain function and simpler materials can be used in the other regions.

In a preferred embodiment of the invented device, the processing unit is provided with the introduction mechanism for the second material.

Preferably, this processing unit is provided with a laser beam deflection mechanism with which the laser beam can scan plane regions below the processing unit without moving the positioning mechanism. This increases the processing velocity during processing utilizing selective laser beam melting technology. The deflection element is preferably formed by an X-Y scanning mirror. When processing the first regions, in which the first material is sought to form the layer, the positioning mechanism is not continuously moved but rather in certain steps. The interval between the individual steps is covered by the scanning optics of the processing unit. When processing the second regions, in which the second material is introduced via the introduction device, only the positioning mechanism, which guides the laser beam continuously according to the shape respectively the contour of the to-be-produced regions, is employed. When switching between the first and the second material, feed velocity and laser performance are, of course, adapted accordingly.

The positioning mechanism itself preferably comprises two perpendicular linear axes by means of which the processing unit is moved.

The present invention is described once more in the following using a preferred embodiment with reference to the FIGURE.

FIG. 1 shows a diagram of an example of a device for fabricating components from combinations of materials. The figure shows the bottom surface 1 into which a building platform 2 is lowered. The building platform is lowered in Z direction. In the present example, the plane of bottom surface 1 is simultaneously the processing plane 3. The system is designed like a laser beam melting system and comprises, in addition to the building region with the lowerable building platform, a powder supply tank for powdered first material 4 and a mechanism for uniform distribution of the powdered material 4 in the processing plane above the building platform. The powder supply tank is not depicted in the figure but is disposed and operated like in the laser beam melting systems known in the art. The leveling mechanism is a scraper (5).

The process executable with this device and the resulting advantages are achieved, in particular, by the design of the processing head 6. In the present example, this processing head contains an X-Y scanner 7 in the form of at least one rotatable mirror, a focusing lens 8 for focusing the laser beam 11 emitted by the laser source onto the processing plane 3, an introduction mechanism 9 for the second material and a suction device 10. In the present case, the introduction mechanism 9 is designed as a powder nozzle with which the powdered second material 12 can be focused in the form of a jet of powder into the focal range of the laser beam 11. If the second material is introduced in a solid state, that is in the form of a wire, instead of the powder nozzle, an introduction mechanism for wire is employed in the processing head 6. The processing head itself is mounted on an X-Y traversing unit which is not depicted in the figure. Such a positioning mechanism can, for example, be set up like a plotter mechanism. With this X-Y traversing unit, the processing head 6 can be moved to any position within a plane parallel to the bottom surface 1 respectively processing plane 3. In this manner, the laser beam always remains focused onto the processing plane. In the present example, the suction unit 10 is designed like a nozzle, the width of which permits suctioning off the powdered first material 4 in those regions in which the layer is sought to be made of the second material 12.

The component is built up in layers. First a layer of the powdered material 4 is applied on the building platform 2 with the leveling system 5. The corresponding region of powder layer, which belongs to the to-be built basic body, is solidified from the powdered material 4 using the selective laser beam melting principle. A laser beam 11 is deflected by means of a scanning mirror 7 over a predetermined scanning region 13. If the predetermined scanning region 13 over which the laser beam can be moved by means of the scanning mirror 7 is smaller than the to-be-built-up region of the component, this region of the scanning field is processed first. Then the processing head 6 is moved in the region to be processed next by means of the linear axes of the positioning mechanism. In this manner, the entire to be processed surface is subdivided into small subfields respectively subdivisions, in which scanning always occurs solely by moving the scanning mirror 7. Only the additionally required transport from subfield to subfield is executed by the positioning mechanism. Introduction of the second material 12 by the introduction mechanism 9 is interrupted while processing to build up the layer with the first material, that is during the scanning processing by means of the scanning mirror 7. For example, the bottom region of the component 14 depicted in FIG. 1 is built up according to the described procedure. The regions of component 14 respectively of the layers of component 14 which belong to the most stressed regions when using the finished component are built up with the second material 12 according to the principle of laser beam generative technology. Preferably a hard material, for example a carbide, is used as this material. When a layer is built up which is sought to comprise both materials, first the layer region with the first material is built up in the respective regions according to the above-described procedure. Then the powdered material 4 is removed from the regions which are sought to be made of the second material. This removal of the powdered first material 4 occurs using the suction unit 10. During laser beam generation of the layer regions to be made of the second material 12, the scanning mirror 7 remains in a fixed position. The laser beam 11 is moved solely by moving the processing head 6 by means of the linear axes of the positioning mechanism over the regions to be processed. Simultaneous with this movement, the second material 12 is introduced into the focus of the laser beam 11 through the powder nozzle 9 and is melted there. After processing the layer, the building platform is lowered the thickness of a layer and the next layer is processed.

This process is repeated layer for layer until the complete component has been built.

The FIGURE shows the processed regions of the component made with different materials. In the top most layer of component 14, which is just being processed in the figure, one can see in four small regions (black) that for reinforcement the layer is made of the second material 12.

The fundamental process principles of the methods of metal-melting fabrication of layers employed in the present process and the accompanying device are known to someone skilled in the art. Although a powdered material is used as the first material in the present preferred embodiment and in the examples described in the specification, this material can, of course, also be used in a liquid phase and using the second material in a liquid phase is just as feasible without having to change the essential features of the invented device respectively invented process. The present device and process permit fabricating components that are made of not just two but also three or more materials as well. In this case, only material introduction through the introduction mechanism 9 has to be provided with other materials. This can be done in a simple manner while processing a layer. Thus the process and device permit fabricating components that are made of different materials so that, for example, a complex component can be reinforced with hard materials at the necessary points. The range of applications for rapid production processes for manufacturing series products is therefore substantially expanded.

What is claimed is:

1. A device for fabricating components from a combination of materials, with said device comprising a bottom surface having a lowerable building platform for a component, a first introduction mechanism with a mechanism for leveling a powdered material in a processing plane above said building platform, a laser light source for emitting a laser beam, a processing unit having a focusing optical system for focusing said laser beam onto said processing plane, and a positioning mechanism which can position said processing unit in any desired position in a plane parallel to said processing plane above said component, wherein a suction or blow-off unit for suctioning off or blowing off, respectively, material from said processing plane and a second introduction mechanism for a further material are provided.

2. A device according to claim 1, wherein said suction or blow off unit is attached to said processing unit.

3. A device according to claim 1 or 2, wherein said processing unit is provided with a deflecting element for said laser beam, with which said laser beam can be deflected onto any desired point within a region of said processing plane dependent on the respective position of said positioning mechanism.

4. A device according to claim 3, wherein said deflecting element is an X-Y scanning mirror system.

5. A device according to one of claim 1 or 2, wherein said second introduction mechanism is attached to said processing unit and designed in such a manner that said further material can be brought in a concentrated manner in the focal range of said laser beam.

6. A device according to claim 5, wherein said second introduction mechanism is a nozzle for powdered materials and is directed onto said focal range of said laser beam.

7. A device according to claim 5, wherein said second introduction mechanism is a feed mechanism for wire-shaped materials.

8. A device according to claim 1 or 2, wherein said second introduction mechanism comprises a supply tank for said further material and a scraper which distributes said further material in said processing plane above said building platform.

9. A device according to claim 1 or 2, wherein said positioning mechanism is an X-Y moving unit having two linear axes.

10. A device according to claim 1 or 2, wherein said mechanism for leveling has a form of a scraper.

11. A method of building components from a combination of materials of at least a first material and a second material comprising building up a component by means of layerwise application and melting of said materials layer for layer, including the following steps for at least one of said layers: distributing said first material with a leveling mechanism in a processing plane above a lowerable building platform for said component, and scanning the shape of the layer of said component using a laser beam focused onto said processing plane in first regions of said processing plane, with said first material being melted on according to said scanned shape of said first regions; suctioning off or blowing off said first material in second regions of said processing plane in which said component is sought to be made of said second material or a chemical compound of said second material; applying said second material in said second regions of said processing plane and scanning the shape of the layer of said component using a laser beam focused onto said processing plane, with said second material or said chemical compound of said second material being melted according to said scanned shape in said second regions; and lowering said building platform a thickness of said melted layer if a further layer is sought to be applied.

12. A method according to claim 11, wherein said second material is brought in a concentrated manner in said focal range of said laser beam via a separate introduction mechanism.

13. A method according to claim 11, wherein said second material is applied in the same manner as said first material in said second regions of said processing plane.

14. A method according to claim 11, 12 or 13, wherein said scanning of the shape of each layer of said component in said processing plane occurs by means of a positioning mechanism which bears a focusing optical system for focusing said laser beam and can move said focusing optical system on any desired paths in a plane parallel to said processing plane above said component.

15. A method according to claim 14, wherein said scanning of said first regions is executed by means of successive scanning of subregions above which said laser beam is led by means of a scanning element which is borne in a rotatable manner and is led with said laser beam by said position mechanism, whereas scanning of said second regions is executed with a stationary scanning element.

* * * * *